United States Patent Office 2,848,428
Patented Aug. 19, 1958

2,848,428

LATENT FOAMING COMPOSITIONS OF VINYL AROMATIC RESINS AND METHOD OF MAKING

Louis C. Rubens, Midland, Mich., assignor to The Dow Chemical Company, Midland, Mich., a corporation of Delaware No Drawing. Application June 1, 1953
Serial No. 358,963

6 Claims. (Cl. 260—2.5)

This invention relates to the manufacture of cellular plastic articles from vinyl aromatic resins. It pertains especially to resinous compositions comprising a copolymer of a predominant amount of a monovinyl aromatic compound, a minor proportion of a polyvinyl aromatic compound, and a foaming agent, which compositions are suitable for making cellular articles. The invention also concerns a method of making the resinous compositions and relates to the cellular product.

Cellular or foamed thermoplastic resins, e. g. cellular polystyrene, and methods of making the same are well known. Munters et al. in U. S. Patent No. 2,023,204 have disclosed a method for the preparation of cellular polystyrene which involves heating solid polystyrene and a gas such as methyl chloride in a closed vessel under pressure to a temperature above the fusion point of the polymer, i. e. to about 170° C., to cause absorption of a portion of the gas by the polymer and thereafter opening a bottom valve to permit flow of the polymer from the vessel into a zone of lower pressure, e. g. the atmosphere, wherein the polymer is swollen by expansion of the gas to form a cellular body. The patent mentions that other gases such as air, carbon dioxide, nitrogen, etc., may be used in place of methyl chloride in forming the cellular product.

McIntire, in U. S. Patent 2,450,436, describes a method of making cellular polystyrene wherein a normally gaseous agent such as methyl chloride, methyl ether, methyl ethyl ether, propylene, butylene, etc., is dissolved in polystyrene under pressure, after which the mixture is brought to a temperature below the critical temperature of the normally gaseous agent to form a mobile gel, then opening a bottom valve to permit flow of the gel from the vessel into a zone of lower pressure, wherein the polymer is swollen by expansion of the normally gaseous agent upon release of the pressure, to form a cellular product composed for the most part of individually-closed thin-walled cells.

The process is usually carried out at temperatures such that upon release of the pressure and vaporization of the dissolved normally gaseous agent with resultant expansion of the resin and formation of a cellular structure, the resin body is cooled to a temperature not substantially above the second order transition temperature, or heat distortion temperature, of the resin in order to avoid excessive shrinkage or collapse of the cellular article. In most instances the normally gaseous agent is completely vaporized and is in part rapidly diffused from the resin upon release of the pressure and expansion of the mobile gel.

It is an object of the invention to provide a method for making cellular plastic articles from copolymers of a predominant amount of one or more monovinyl aromatic compounds and from 0.01 to 0.5 percent by weight of a polyvinyl aromatic compound, e. g. divinylbenzene. Another object is to provide resinous latent foaming compositions comprised of such slightly cross-linked copolymers having a foaming agent intimately incorporated therewith. A further object is to provide a method of making latent foaming compositions comprised of the above-mentioned copolymers and a minor proportion of a volatile foaming agent. Still another object is to provide cellular plastic articles composed for the most part of individually-closed thin-walled cells from copolymers of a predominant amount of a monovinyl aromatic compound and from 0.01 to 0.5 percent by weight of a polyvinyl aromatic compound, e. g. divinylbenzene. Other and related objects may appear as the invention is further described.

According to the invention the foregoing and related objects are obtained by dissolving a volatile foaming agent as hereinafter described in a liquid mixture of a predominant proportion of at least one monomeric polymerizable monovinyl aromatic compound of the benzene series and from 0.01 to 0.5 percent by weight of a polyvinyl aromatic compound and heating the resulting mixture in a closed vessel to polymerize the monomers and form a solid resinous composition or product.

The resinous composition, comprising the copolymer having the foaming agent intimately incorporated therewith, can readily be foamed by heating the same at elevated temperatures, suitably above the second order transition temperature of the copolymer and above the boiling point of the foaming agent, such that the foaming agent is caused to vaporize with resultant expansion of the copolymer to form a cellular body.

Any polymerizable monovinyl aromatic hydrocarbon of the benzene series, or nuclear halogenated derivative thereof, such as styrene, ortho-, meta-, and para-vinyltoluene, vinylxylenes, ar-ethylvinylbenzene, ar-chlorostyrene, ar-dichlorostyrene, ar-chlorovinyltoluene, or isopropylstyrene, or mixtures of any two or more of such monovinyl aromatic compounds, may be employed in admixture with a polyvinyl aromatic compound such as divinylbenzene, divinyltoluene, divinylxylene, or divinylethylbenzene, in amount corresponding to from 0.01 to 0.5 percent by weight, based on the weight of the polymerizable monomeric materials.

The polymeric compositions should contain from 0.01 to 0.5, preferably from 0.03 to 0.4 percent by weight, based on the weight of the copolymer, of at least one polyvinyl aromatic compound, e. g. divinylbenzene, chemically combined with from 99.5 to 99.99, preferably from 99.6 to 99.97, percent by weight of one or more monovinyl aromatic compounds such as styrene, or vinyltoluene, and should swell appreciably, but be insoluble or substantially insoluble, in toluene, i. e. the solid polymeric composition should have a volume swelling ratio in toluene at 21° C. of at least 3. Such compositions can readily be foamed by heating the same at temperatures substantially above the heat distortion temperature of the copolymer, e. g. at temperatures of from 100° to 185° C. or higher, to form cellular articles which do not tend to rapidly collapse or undergo excessive shrinkage upon continued heating at the elevated foaming temperature. Copolymers of a monovinyl aromatic compound such as styrene, or vinyltoluene, and a polyvinyl aromatic compound such as divinylbenzene, containing 0.005 percent by weight or less of the latter are usually soluble in toluene and when foamed, readily collapse, or undergo excessive shrinkage, upon heating at foaming temperatures of 100° C. or above. Copolymers containing more than about 0.5 percent by weight of a polyvinyl aromatic compound, e. g. divinylbenzene, chemically combined with one or more monovinyl aromatic compounds such as styrene, or vinyltoluene, are usually so highly cross-linked and resistant to expansion by a foaming agent that they cannot satisfactorily be foamed to form a stable cellular product of low density by the method herein described. The highly cross-linked copolymers possess an elasticity, probably due to the greater number of cross-links in the copolymer molecules, and when foamed at elevated temperatures, e. g. a temperature of 130° C., as herein described, the foamed copolymer tends to rapidly shrink or collapse.

The foaming agent may be a liquid or gas at ordinary temperatures and pressures, i. e. at atmospheric conditions. The foaming agent should be an organic compound which is a poor solvent for the copolymer and should have a boiling point not substantially above the heat distortion temperature of the copolymer, i. e. it should have a boiling point of 95° C. or lower, at atmospheric pressure. It should be soluble in the polymerizable monomeric vinyl aromatic compounds from which the copolymers are prepared and should be soluble in, but should not swell appreciably the solid copolymer. The organic compound to be employed as a foaming agent should have a molecular weight of at least 58, or greater, and have a molecular size such that it does not readily diffuse through interstices between the copolymer molecules at ordinary temperatures and pressure, e. g. at room temperature or thereabout and atmospheric pressure.

Examples of organic compounds which are suitable foaming agents are saturated aliphatic hydrocarbons such as butane, isobutane, pentane, hexane and heptane, or saturated aliphatic or cyclic perchlorofluorocarbons. Examples of suitable perchlorofluorocarbons are:

$$CCl_3F$$
$$CCl_2F_2$$
$$CClF_3$$
$$CCl_2F\text{---}CCl_2F$$
$$CClF_2\text{---}CCl_2F$$
$$CClF_2\text{---}CClF_2$$
$$CF_3\text{---}CClF_2$$

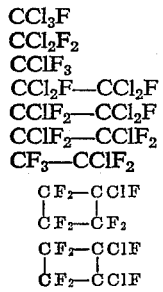

Mixtures of any two or more of such agents or compounds may also be used.

The foaming agent is usually employed in amount corresponding to from 0.05 to 0.3 gram molecular weight of said agent per 100 grams of the vinyl aromatic compounds chemically combined in the copolymer. The proportion of the foaming agent is usually calculated on a molar basis per 100 parts by weight of the polymerizable vinyl aromatic compounds employed as starting materials in preparing the resinous composition in order to have present in said composition an amount of said foaming agent sufficient to provide an equal or substantially equal volume of vapors for subsequently expanding the copolymer to form a cellular product, regardless of the density of the foaming agent employed.

The latent-foaming resinous compositions of the invention are prepared by dissolving one or more of the aforementioned foaming agents in a liquid mixture of the polymerizable monomeric vinyl aromatic compounds in the desired proportions and thereafter heating the mixture in a closed vessel to polymerize the monomer and form a solid polymeric product or composition, i. e. a log, bar, billet, or granules, of the copolymer having the foaming agent uniformly incorporated therewith. The composition is cooled to a temperature below the heat distortion temperature of the copolymer, suitably to room temperature or thereabout, and is removed from the vessel.

The polymerization may be carried out by heating a mixture of the vinyl aromatic compounds and the foaming agent in bulk, i. e. in the substantial absence of other inert liquids, in a closed container at a polymerization temperature within the range of from 40° to 150° C., and under at least autogenous pressure of the components, or a higher pressure, to form a log, bar, or billet, of the resinous composition. The product is cooled, suitably to room temperature, is removed from the container and is usually crushed or broken to a granular form suitable for molding, or for convenience in handling. A log or billet of the resinous composition may be crushed or broken to a granular form in usual ways, e. g. by grinding the same at room temperature or thereabout and at atmospheric pressure.

In a preferred practice, the resinous latent-foaming compositions are prepared in granular or bead form by polymerizing a liquid mixture of the monomeric starting materials and the foaming agent in the desired proportions, while the liquid is dispersed as droplets in an aqueous medium, suitably by heating the same at a temperature of from 40° to 150° C., preferably from 50° to 120° C., under pressure to form a solid granular resinous product. The mixture is cooled, removed from the vessel and separated from the aqueous medium, washed and dried.

Usually a polymerization catalyst such as benzoyl peroxide, di-tertiary-butyl-peroxide, cumene peroxide, tertiary-butyl-perbenzoate, or alpha, alpha'-azobisisobutyronitrile, is added to the mixture in amount of from 0.01 to 2 percent by weight of the monomers to facilitate the polymerization reaction, but a catalyst is not required.

The polymerization is carried out at temperatures of from 40° to 150° C., preferably from 50° to 120° C., so as to form a solid resinous composition comprising the slightly cross-linked copolymer having the foaming agent incorporated therewith, which composition has a volume-swelling ratio in toluene at 21° C. of at least 3 and preferably from 6 to 40. The volume-swelling ratio of the composition in toluene is dependent in part upon the proportion of the polyvinyl aromatic compound chemically combined in the copolymer and in part upon the polymerization conditions, i. e. the temperature at which the polymerization is carried out, and whether a catalyst for the polymerization is employed. In general, the volume-swelling ratio of the copolymer in toluene becomes lower as the proportion of the polyvinyl aromatic compound is increased from 0.01 to 0.5 percent by weight of the monomeric starting materials, under otherwise similar polymerization conditions. Also, for a given proportion of the polyvinyl aromatic compound, e. g. divinylbenzene, the volume-swelling ratio of the copolymer in toluene becomes greater as the rate of polymerization is increased, e. g. by raising the temperature of polymerization, or by the addition of a polymerization catalyst.

The invention permits the production of latent foaming compositions comprised of a slightly cross-linked vinyl aromatic resin and a foaming agent, in which compositions the resinous component obtained by the copolymerization of a mixture of a predominant proportion of a monovinyl aromatic compound and from 0.01 to 0.5 percent of a polyvinyl aromatic compound can be varied with change in the polymerization conditions, or the proportion of the polyvinyl aromatic compound employed, within the limits herein specified, with resultant formation of compositions having different foaming characteristics and suitable for a variety of purposes.

The resinous polymeric compositions can be stored at ordinary temperatures and pressures for periods of time of from several days to several months without substantial lowering of the foaming characteristics through loss of said foaming agents, e. g. by diffusion and vaporization of the foaming agent from the copolymer. The resinous compositions can be heated at temperatures above the heat distortion temperature of the copolymer and foamed to form a cellular article. The compositions in granular or bead form are suitable for use as foaming in place resins. The resin granules can be poured into a mold or other chamber, e. g. hollow propellors for airplanes, which cavity is suitably of slightly smaller volume than the maximum volume attained by the foamed copolymer, and heated in place to form a cellular article of predetermined shape, or to completely fill a cavity with the cellular product. The granular resin compositions when foamed in place, e. g. by heating in a mold or chamber, usually coalesce or fuse together during the foaming step to produce a stable unitary cellular structure having a continuous outer surface or skin of the copolymer covering an inner mass of the copolymer in the form of individually-closed thin-walled cells.

The temperature to be employed in foaming the resinous compositions to form a cellular product will vary depending in part upon the degree of cross-linking or the proportion of polyvinyl aromatic compound chemically combined with the monovinyl aromatic compound in the copolymer. In foaming the resinous compositions to produce a cellular body or mass of the copolymer composed of substantially uniform cells the composition should be heated at the foaming temperature for a time such as to bring inner portions of the mass of the material to a temperature above the heat distortion temperature of the copolymer and cause substantial expansion of said portions of the mass in order to expand the latter and avoid the formation of a foamed product composed of an outer cellular mass having a solid or dense resinous core. In general, the resinous compositions comprising copolymers containing the smaller amounts, e. g. from 0.01 to 0.02 percent by weight of a polyvinyl aromatic compound chemically combined or interpolymerized with one or more monovinyl aromatic compounds can satisfactorily be foamed by heating the same at temperatures of from 100° to 120° C. without undergoing excessive shrinkage or collapse of the cellular product prior to completing the expansion. Resinous compositions of the copolymers containing from about 0.4 to 0.5 percent by weight of a chemically combined polyvinyl aromatic compound, e. g. divinylbenzene, based on the weight of the copolymer, can usually be satisfactorily foamed by heating at temperatures of from 100° to 130° C. The resinous compositions comprising copolymers of from 0.03 to 0.35 per cent by weight of a polyvinyl aromatic compound such as divinylbenzene chemically combined with one or more monovinyl aromatic compounds can satisfactorily be foamed by heating the same at temperatures of from 100° to 185° C., or higher, to form substantially uniform cellular products. In all instances the resinous compositions comprising a foaming agent as herein specified and a copolymer of from 99.5 to 99.99 percent by weight of at least one monovinyl aromatic compound of the benzene series chemically combined with from 0.01 to 0.5 percent of a polyvinyl aromatic compound, e. g. divinylbenzene, can be foamed by heating at a temperature within the range of from 100° to 185° C., to produce a cellular body or mass having substantially greater stability to heat than has a composition of a homopolymer of styrene prepared and foamed under similar conditions.

In a preferred practice for the production of cellular articles from the resinous compositions, a mass of the latter in granular form is placed in a mold having a volume less than the maximum volume attained by the foamed copolymer, suitably a volume of at least two, preferably from 10 to 40 times the volume of the granular mass of the starting material and heated to a foaming temperature within the range of from 100° to 185° C., preferably a temperature of 130° C. or above, such that the copolymer is caused to expand and the mass is caused to flow together to form a unitary cellular article conforming to the shape of the mold. In expanding the copolymer, vapors of the foaming agent diffuse from the cellular product and are vented or allowed to escape from the mold. After expansion of the copolymer to form a unitary cellular body composed for the most part of individually-closed thin-walled cells of substantially uniform size conforming to the shape of the mold, the cellular product is cooled and removed from the mold. A mold may be partially, or completely, filled with a mass of the granular composition and the material heated at a temperature of 130° C. or above to form a unitary cellular article having a predetermined shape and a desired density. The invention permits the production from a single composition of cellular articles having different densities and a predetermined shape, e. g. boards, bars, strips, panels, or sheets. The foamed copolymers or cellular products are useful as insulation for refrigerators, deep freeze units and cold storage chambers. They are also useful as fillers for life belts, buoys, life rafts and other apparatus designed to be buoyant in water.

The following examples illustrate ways in which the principle of the invention has been applied, but are not to be construed as limiting its scope.

EXAMPLE 1

A mixture of 90 grams of styrene, 0.036 gram of ethylvinylbenzene and 0.054 gram of divinylbenzene, together with 10 grams of Freon 12 (dichlorodifluoromethane), and 0.5 gram of alpha,alpha'-azobisisobutyronitrile as catalyst, was polymerized by heating the mixture in a sealed glass tube at a temperature of 50° C. for a period of 218 hours. The tube was cooled and the polymeric product removed and crushed to a granular form. It was analyzed and found to contain 9.23 percent by weight of dichlorodifluoromethane. A portion of the product was foamed by immersing the same in an oil bath maintained at a temperature of 125° C. The cellular mass had a volume 17 times greater than the initial volume of the polymeric starting material. Other portions of the granular polymeric product were stored at room temperature. After storage for 69 days the product contained 6.51 percent by weight of dichlorodifluoromethane. A portion of the aged polymeric product was foamed by immersing the same in an oil bath at a temperature of 125° C. The cellular mass had a volume 17 times greater than the initial volume of the aged polymeric product. After storing for 99 days the granular product contained 5.4 percent by weight of dichlorodifluoromethane and when foamed at a temperature of 125° C., formed a cellular mass having a volume 10 times greater than its initial volume.

EXAMPLE 2

A resinous composition comprising a copolymer of 99.9 percent by weight of styrene, 0.04 percent of ethylvinylbenzene and 0.06 percent divinylbenzene, and 13 percent of dichlorodifluoromethane, based on the weight of the composition, was prepared by procedure similar to that described in Example 1. A portion of the granular product was foamed by immersing the same in an oil bath at a temperature of 125° C. The cellular mass had a volume 24 times greater than the initial volume of the mass of the test portion of the copolymer. Other portions of the composition were stored at room temperature. After 54 days the product contained 8.43 percent by weight of dichlorodifluoromethane. It was foamed by heating the same at a temperature of 125° C. and formed a cellular mass having a volume 18 times greater than the initial volume of the test portion. After storing at room temperature for 80 days, the composition contained 7.65 percent dichlorodifluoromethane.

A similar granular polymeric composition containing 20 percent by weight of dichlorodifluoromethane, based on the weight of the composition, was prepared and a portion thereof was foamed by heating the same at a temperature of 125° C. to form a cellular mass having a volume 31 times greater than the initial volume of the composition. After storing the remaining portion of the composition at room temperature for a period of 21 days it contained 18.05 percent by weight of dichlorodifluoromethane and, when heated at a temperature of 125° C., foamed to form a cellular mass having a volume 31 times its initial volume.

EXAMPLE 3

A mixture of 100.84 grams of 2,5-dichlorostyrene, 0.04 gram of ethylvinylbenzene and 0.06 gram of divinylbenzene, together with 13 grams of dichlorodifluoromethane as foaming agent and 0.5 gram of alpha,alpha'-azobisisobutyronitrile as catalyst, was polymerized by heating the same in a sealed glass tube for 3 days at 50° C. and then for 5 days at 80° C. The tube was cooled and the polymeric product removed. It was crushed to a granular form. A portion of the product was foamed by immersing the same in an oil bath maintained at a temperature of 175° C. The composition foamed to form a cellular mass having a volume 10 times greater than its initial volume. The copolymer foam did not shrink upon heating at a temperature of 175° C. for a period of one hour.

In contrast, a composition of a homopolymer of 2,5-dichlorostyrene and dichlorodifluoromethane in similar proportions readily foams to form a cellular mass when heated at a temperature of 175° C., but shrinks to a volume of only 3 times the initial volume of the composition when maintained at a temperature of 175° C. for a period of one hour.

EXAMPLE 4

A charge of 82.16 grams of a mixture of approximately 70 percent by weight of meta-vinyltoluene and 30 percent paravinyltoluene, 0.04 gram of ethylvinylbenzene and 0.06 gram of divinylbenzene, together with 13 grams of dichlorodifluoromethane as foaming agent and 0.5 gram of alpha,alpha'-azobisisobutyronitrile as catalyst, was polymerized by heating the same in a sealed glass tube for 3 days at 50° C. then at 80° C. for 5 days. The tube was cooled and the polymeric product removed and crushed to a granular form. A portion of the product was foamed by immersing the same in an oil bath at a temperature of 130° C. The cellular mass had a volume 20 times greater than the initial volume of the mass of the test portion of the composition. After heating the cellular mass at 130° C. for a period of one hour, its volume was 10 times the initial volume of the composition.

In contrast, a composition consisting of the polymeric meta- and para-vinyltoluenes and dichlorodifluoromethane in similar proportions when heated at a temperature of 130° C., foamed to produce a cellular mass having a volume of only 7.5 times its initial volume. The cellular body shrunk to a volume only two times as great as the initial volume upon heating at a temperature of 130° C. for one hour.

Example 5

A charge of 5994 grams of styrene, 2.4 grams of ethylvinylbenzene and 3.6 grams of divinylbenzene, together with 896 grams of dichlorodifluoromethane and 60 grams of alpha,alpha'-azobisisobutyronitrile, as foaming agent and polymerization catalyst, respectively, was polymerized by heating the same in a closed container under time and temperature conditions as follows: 6 days at 40° C.; 1 day at 60° C.; and 5 days at 95° C. The sealed container and contents were cooled to about 10° C. and the container stripped from the polymeric product. The product was a solid billet 5.5 inches in diameter by approximately 17 inches long. It had a density of 68.7 pounds per cubic foot. A cylindrical piece having the dimensions 5.5 inches in diameter by 10 inches long was cut from the center portion of the billet and heated in an oven at a temperature of 150° C. for a period of 8 hours. The resinous product foamed to form a cellular body having a volume approximately 29 times greater than its initial volume. The foamed cellular product had a density of 2.13 pounds per cubic foot.

Example 6

A mixture of 99.9 parts by weight of styrene, 0.04 part of ethylvinylbenzene and 0.06 part of divinylbenzene was prepolymerized to a syrupy liquid by heating the same under reflux for a period of 20 minutes, then cooled to room temperature. Ten parts by weight of "Skellysolve," principally aliphatic hydrocarbons boiling at 28°–38° C.), and 0.5 part of alpha,alpha'-azobisisobutyronitrile was added. The mixture was sealed in a glass container and polymerized to a solid resinous product by heating at a temperature of 50° C. for 3 days. The product was removed from the container. A portion of the solid resinous composition was heated in an oil bath at a temperature of 130° C. It expanded to form a cellular mass having a volume 26 times greater than the initial volume of the test portion. After heating for one hour at a temperature of 130° C. the cellular product had a volume 19 times as great as the initial test piece. The resinous composition foamed at a temperature of 100° C. to form a cellular mass having a volume 22 times as great as its initial volume. The cellular product did not shrink upon heating at a temperature of 100° C. for a period of one hour.

Example 7

A charge of 37.2 grams of styrene, 0.016 gram of ethylvinylbenzene and 0.026 gram of divinylbenzene, together with 5.6 grams of dichlorodifluoromethane, 0.37 gram of alpha,alpha'-azobisisobutyronitrile, and 173.5 grams of an aqueous solution containing approximately 0.02 gram of methyl cellulose (1500 cps.) was sealed in a closed vessel. The mixture was agitated and heated at a temperature of 85° C. for 22 hours to polymerize the monomers. The mixture was cooled, removed from the vessel and the granular resinous product washed with water and dried. A charge of 4 grams of the granular resinous composition was placed in a one ounce glass bottle and heated in an oil bath at a temperature of 135° C. for a period of 5 minutes. The granules foamed and coalesced to form a cellular mass completely filling the bottle. It was removed by breaking the bottle. The product was a unitary cellular body composed of a mass of substantially uniform small cells having a continuous outer skin or layer and conforming to the shape of the bottle. Another portion of the granular product was foamed by immersing the same in an oil bath at a temperature of 130° C. The resin granules foamed to form cellular pellets having a volume approximately 30 times as great as the initial resin granules. After storing the resin granules at room temperature and atmospheric pressure for a period of two months, the foaming characteristics of the resinous composition were unchanged.

Example 8

A charge of 20 grams of styrene containing 0.02 percent by weight of a mixture of approximately 60 percent by weight of divinylbenzene and 40 percent of ar-ethylvinylbenzene, together with 2.6 grams of dichlorodifluoromethane and 0.1 gram of alpha,alpha'-azobisisobutyronitrile as foaming agent and polymerization catalyst, respectively, was sealed in a 0.5 inch internal diameter glass tube and polymerized by heating the same at a temperature of 55° C. for a period of 7 days, then heating at 98° C. for 4 days. The tube was cooled and the polymeric product removed as a solid piece. It was crushed to a granular form. A piece of the polymeric product approximately the size of a bean was placed in an oil bath maintained at a temperature of 130° C. In a period of 2.3 minutes the polymeric composition foamed to a cellular mass having a volume 24 times greater than its initial volume.

In contrast, styrene polymerized in admixture with dichlorodifluoromethane and foamed under conditions similar to those just described, formed a cellular mass having a volume only 12 times greater than the initial volume of the test piece of the polymeric composition.

EXAMPLE 9

In each of a series of experiments, a charge of approximately 20 grams of styrene, ar-ethylvinylbenzene and divinylbenzene in proportions as stated in the following table, together with 15 percent by weight of dichlorodifluoromethane and 0.5 percent of alpha,alpha'-azobisisobutyronitrile, based on the weight of the polymerizable materials was sealed in a 0.5 inch internal diameter glass tube and polymerized by heating the same at a temperature of 55° C. for a period of 7 days, then at 98° C. for a period of 4 days. The tube was cooled and the polymeric product removed as a solid block. It was crushed to a granular form. A test piece of the polymeric product was immersed in an oil bath maintained at a temperature of 130° C. and allowed to expand while determining the volume of the foam at successive intervals of time. The ratio of the volume of the foam to the initial volume of the test piece of the polymeric product is a measure of the foaming characteristics for the composition. The time for which the foam can be heated at the foaming temperature without undergoing excessive shrinkage is a measure of the thermal stability of the foamed copolymer. Table I identifies each polymeric composition by stating the proportions of styrene, ar-ethylvinylbenzene and divinylbenzene in the monomer starting materials from which it was prepared. The table also gives the temperature at which the composition was foamed, a foaming characteristic expressed as the ratio of the maximum volume of the foam to the initial volume of the test piece of the composition and the thermal stability of the foam expressed as the time in minutes that the foam is heated at the foaming temperature of 130° C., after reaching its maximum volume, until the cellular mass decreases by shrinkage to a volume corresponding to one-half of the maximum volume. For purpose of comparison, a composition of polystyrene was prepared and foamed under similar conditions. The results obtained are also included in the table.

The foam was maintained in the oil bath and its volume measured one hour after initial immersion of the test piece in the bath. The amount of shrinkage which the foamed copolymer undergoes is a measure of the heat stability of the foamed copolymer or cellular product. The greater the shrinkage the less heat stable is the foam. Other test pieces of the polymeric composition were employed to determine a volume-swelling ratio for the copolymer in toluene at 21° C. The procedure for determining the volume-swelling ratio for the copolymer was to immerse a test piece of the composition in toluene at a temperature of 21° C. and allow the copolymer to swell to equilibrium, then measure the volume of the swollen copolymer. The volume-swelling ratio is calculated as the volume of the swollen copolymer at equilibrium conditions divided by the initial volume of the test piece. The copolymer had a volume-swelling ratio in toluene of 9.9. The polymeric composition foamed to form a cellular mass having a volume 15 times greater than the initial volume of the test piece at each of the foaming temperatures of 100°, 115° and 130° C. No shrinkage of the foam occurred upon heating the same for one hour at said temperatures.

In contrast, a composition of polystyrene and dichlorodifluoromethane in the same proportions was prepared and foamed under similar conditions. It foamed to a maximum volume 12 times greater than the initial volume of the test piece at a temperature of 100° C., in six minutes, but four minutes later the foam had shrunk to a volume of only twice the initial volume of the test piece. At temperatures of 115° and 130° C. the polystyrene composition foamed to a maximum volume 4 times greater than the initial volume of the test piece in two minutes, then shrunk in one minute to a volume only twice as great as the initial volume of the test piece.

EXAMPLE 11

In each of a series of experiments, 34.8 grams of a mixture of styrene ar-ethylvinylbenzene and divinylben-

*Table I*

| Run No. | Starting Materials | | | | Foamed Product | | |
|---|---|---|---|---|---|---|---|
| | Percent Styrene | Percent Ethylvinyl Benzene | Percent Divinyl Benzene | Percent Dichloro Difluoro Methane | Foaming Temp., °C. | Foam Vol. / Initial Vol. | Stability, Min. |
| 1 | 100 | | | 13 | 130 | 12 | 7 |
| 2 | 99.83 | 0.07 | 0.10 | 13 | 130 | 24 | 780 |
| 3 | 99.77 | 0.09 | 0.14 | 13 | 130 | 25 | 780 |
| 4 | 99.72 | 0.11 | 0.17 | 13 | 130 | 25 | 780 |
| 5 | 99.67 | 0.13 | 0.20 | 13 | 130 | 25 | 61 |

EXAMPLE 10

A charge of 34.8 grams of a mixture of 99.925 percent by weight of styrene, 0.025 percent ar-ethylvinylbenzene and 0.05 percent divinylbenzene, together with 5.2 grams of dichlorodifluoromethane was polymerized by heating the same in a sealed glass tube at a temperature of 80° C. for a period of 7 days. The tube was cooled and the polymeric product removed as a solid rod having a diameter of 0.5 inch. Test pieces were cut from the rod of the solid polymeric product. These test pieces were used to determine a foaming characteristic for the composition and a heat stability value for the foamed copolymer at temperatures of 100°, 115° and 130° C., respectively. The procedure for determining the foaming characteristic for the composition and the heat stability of the foamed copolymer was to immerse a test piece of the composition in an oil bath maintained at the above-mentioned temperatures and measure the maximum volume of the foam, which volume was attained in a period of from 10 to 12 minutes. The ratio of the maximum volume of the foam to the initial volume of the test piece is a measure of the foaming characteristic of the composition.

zene in proportions as stated in the following table, together with 5.2 grams of dichlorodifluoromethane, was polymerized by heating the same in a sealed glass tube at a temperature of 80° C. for a period of 7 days. The tube was cooled and the polymeric product removed as a solid rod having a diameter of one-half inch. A foaming characteristic for the compositions and a heat stability value for the foamed copolymer was determined at a temperature of 100° C. by procedure described in Example 10. The volume-swelling ratio for the copolymer in toluene at a temperature of 21° C. was also determined. Table II identifies each composition by giving the proportions of styrene, ar-ethylvinylbenzene and divinylbenzene, together with the proportion of dichlorodifluoromethane, based on the weight of the composition from which it was prepared. The table gives the volume-swelling ratio in toluene at 21° C. determined for the composition. The table also gives the foaming temperature and a foaming characteristic for the composition, expressed as the ratio of the maximum volume of the foamed copolymer to the initial volume of the test piece. No shrinkage of the foam occurred in one hour at the foaming temperature.

Table II

| Run No. | Starting Materials ||||  Composition, Volume Swelling Ratio in Toluene | Foamed Product ||
|---|---|---|---|---|---|---|---|
| | Percent Styrene | Percent Ethyl-vinyl Benzene | Percent Divinyl Benzene | Percent CCl₂F₂ | | Foaming Temp., °C. | Foam Vol. / Initial Vol. |
| 1 | 99.925 | 0.025 | 0.05 | 13 | 9.9 | 100 | 15 |
| 2 | 99.85  | 0.05  | 0.10 | 13 | 6.8 | 100 | 15 |
| 3 | 99.775 | 0.075 | 0.15 | 13 | 6.3 | 100 | 15 |
| 4 | 99.70  | 0.10  | 0.20 | 13 | 5.2 | 100 | 15 |
| 5 | 99.55  | 0.15  | 0.30 | 13 | 3.5 | 100 | 5  |

EXAMPLE 12

In each of a series of experiments, 34.8 grams of a mixture of styrene ar-ethylvinylbenzene and divinylbenzene in proportions as stated in the following table, together with one percent by weight of alpha,alpha'-azobisisobutyronitrile as catalyst, and 5.2 grams of dichlorodifluoromethane was polymerized by heating the same in a sealed glass tube at a temperature of 80° C. for a period of 7 days. The tube was cooled and the polymeric product removed as a solid rod having a diameter of one-half inch. Test pieces were cut from the solid polymeric product. The test pieces were used to determine a foaming characteristic for the composition, a heat stability value for the foamed copolymer and a volume-swelling ratio in toluene for the composition by procedures as described in the preceding Examples 10 and 11. Table III identifies each polymeric composition by giving the proportion of monomeric vinyl aromatic compounds from which it was prepared. The table also gives a volume-swelling ratio in toluene at 21° C. determined for the composition. The table gives a foaming characteristic for the composition, expressed as the ratio of the maximum volume of the foamed copolymer to the initial volume of the test piece of the composition, the minimum volume of the foamed copolymer one hour after immersion of a test piece of the composition in the foaming bath, and a heat stability value for the foam, expressed as the percent shrinkage, i. e. the calculated value of the maximum volume of the foam minus the minimum volume of the foam divided by the maximum volume of the foam and multiplied by 100. For purpose of comparison the results obtained with a composition of polystyrene and dichlorodifluoromethane in the same proportions, prepared and foamed under similar conditions, are included in the table.

EXAMPLE 13

Other portions of the polymeric compositions described in Example 12 were foamed at a temperature of 130° C. Table IV identifies the polymeric compositions and gives the foaming characteristics determined for the composition and a heat stability value for the foam expressed as the percent shrink 40 minutes after initial immersion of a test piece of the composition in the oil bath at a temperature of 130° C.

Table IV

| Run No. | Starting Materials |||| Composition, Volume Swelling Ratio in Toluene | Foamed Product ||||
|---|---|---|---|---|---|---|---|---|---|
| | Percent Styrene | Percent Ethyl-vinyl Benzene | Percent Divinyl Benzene | Percent CCl₂F₂ | | Foaming Temp., °C. | Max. Foam Vol. Ratio | Min. Foam Vol. Ratio | Percent Shrink |
| 1 | 100   | 0    | 0    | 13 | Soluble | 130 | 33 | 18   | 54.5 |
| 2 | 99.85 | 0.05 | 0.10 | 13 | 21.6    | 130 | 29 | 26.5 | 9    |
| 3 | 99.70 | 0.10 | 0.20 | 12 | 12.7    | 130 | 24 | 23   | 9.5  |
| 4 | 99.55 | 0.15 | 0.30 | 13 | 8.5     | 130 | 22 | 21   | 9.5  |
| 5 | 99.40 | 0.20 | 0.40 | 13 | 7.1     | 130 | 15 | 14   | 9.3  |
| 6 | 99.25 | 0.25 | 0.50 | 13 | 6.7     | 130 | 15 | 5    | 33.3 |

EXAMPLE 14

In each of a series of experiments, 34.8 grams of a mixture of 99.85 percent by weight styrene, 0.05 percent ar-ethylvinylbenzene and 0.1 percent divinylbenzene, together with 0.5 percent by weight of benzoyl peroxide as polymerization catalyst and 5.2 grams of dichlorodifluoromethane was sealed in a 0.5 inch internal diameter glass tube. The mixture was heated at a temperature and for a period of time as stated in the following table to polymerize the monomer. The tube was cooled and the polymeric product removed as a solid rod. Test pieces of each polymeric composition were tested as described in Examples 10 and 11. Table V identifies each polymeric composition by giving the time and temperature conditions for polymerizing the monomer. The table gives the volume-swelling ratio in toluene at 21° C. determined for the polymeric composition. The table also gives the foaming temperature and a foaming characteristic for the composition. No shrinkage of the foamed copolymer occurred in one hour at the foaming temperature.

Table III

| Run No. | Starting Materials |||| Composition, Volume Swelling Ratio in Toluene | Foamed Product ||||
|---|---|---|---|---|---|---|---|---|---|
| | Percent Styrene | Percent Ethyl-vinyl Benzene | Percent Divinyl Benzene | Percent CCl₂F₂ | | Foaming Temp., °C. | Max. Foam Vol. Ratio | Min. Foam Vol. Ratio | Percent Shrink |
| 1 | 100   | 0    | 0    | 13 | Soluble | 100 | 28 | 17 | 39 |
| 2 | 99.85 | 0.05 | 0.10 | 13 | 21.7    | 100 | 25 | 25 | 0  |
| 3 | 99.70 | 0.10 | 0.20 | 13 | 12.7    | 100 | 21 | 21 | 0  |
| 4 | 99.55 | 0.15 | 0.30 | 13 | 8.5     | 100 | 18 | 18 | 0  |
| 5 | 99.40 | 0.20 | 0.40 | 13 | 7.1     | 100 | 14 | 14 | 0  |
| 6 | 99.25 | 0.25 | 0.50 | 13 | 6.7     | 100 | 13 | 11 | 18 |

Table V

| Run No. | Polymerization Conditions | | Composition, Volume Swelling Ratio | Foamed Product | |
|---|---|---|---|---|---|
| | Days | Temp., °C. | | Foaming Temp., °C. | Foam Vol. / Initial Vol. |
| 1 | 21 | 50 | 16.8 | 130 | 33 |
| 2 | 7 | 80 | 17.8 | 100 | 15 |
| 3 | 4 | 110 | 22.2 | 130 | 15 |

I claim:

1. A process for making a resinous polymeric composition suitable for forming a cellular article possessing good dimensional stability at temperatures above the heat-plastifying temperature of the polymer ingredient of the composition, which process comprises polymerizing a liquid mixture containing as the essential ingredients from 99.5 to 99.99 parts by weight of at least one monovinyl aromatic compound of the benzene series having the vinyl radical directly attached to a carbon atom of the aromatic nucleus and from 0.5 to 0.1 part of a polyvinyl aromatic hydrocarbon, together with from 0.05 to 0.3 gram mole per 100 grams of the polymerizable vinyl aromatic compounds of a fluid foaming agent selected from the group consisting of saturated aliphatic hydrocarbons and perchlorofluorocarbons having a molecular weight of at least 58 and boiling at a temperature below 95° C., by subjecting said liquid mixture under at least autogenous pressure to a polymerization temperature of from 40° to 150° C. until a solid polymeric product is obtained, then releasing the pressure at a temperature below the heat distortion temperature of said product.

2. A process as claimed in claim 1, wherein the polyvinyl aromatic compound is divinylbenzene.

3. A cellular forming resinous composition suitable for forming a cellular article possessing good dimensional stability at temperatures above the heat-plastifying temperature of the polymer ingredient of the composition, which composition comprises a solid copolymer of from 99.5 to 99.99 parts by weight of at least one monovinyl aromatic compound of the benzene series having the vinyl radical directly attached to a carbon atom of the aromatic nucleus and from 0.5 to 0.01 part of a polyvinyl aromatic hydrocarbon, having uniformly incorporated therewith from 0.05 to 0.3 gram mole of a fluid foaming agent selected from the group consisting of saturated aliphatic hydrocarbons and percholrfluorocarbons having a molecular weight of at least 58 and boiling at a temperature below 95° C. per 100 grams of the copolymer.

4. A resinous composition as claimed in claim 3, wherein the polyvinyl aromatic compound is divinylbenzene.

5. A resinous composition as claimed in claim 4, wherein the foaming agent is dichlorodifluoromethane.

6. A resinous composition as claimed in claim 5, wherein the copolymer contains in chemically combined form from 99.60 to 99.97 parts by weight of styrene and from 0.4 to 0.03 part by weight of divinylbenzene.

References Cited in the file of this patent

UNITED STATES PATENTS

| | | |
|---|---|---|
| 2,089,444 | Staudinger et al. | Aug. 10, 1937 |
| 2,409,910 | Stober | Oct. 22, 1946 |
| 2,442,940 | Staudinger et al. | June 8, 1948 |
| 2,537,951 | Amos | Jan. 16, 1951 |
| 2,676,927 | McCurdy et al. | Apr. 27, 1954 |
| 2,744,291 | Stastny et al. | May 8, 1956 |

FOREIGN PATENTS

| | | |
|---|---|---|
| 845,264 | Germany | Aug. 14, 1952 |

OTHER REFERENCES

"Styrene, Its Polymers and Copolymers and Derivatives," Boundy and Boyer. Copyright 1952. Pages 728 and 729.

UNITED STATES PATENT OFFICE
CERTIFICATE OF CORRECTION

Patent No. 2,848,428                                                      August 19, 1958

Louis C. Rubens

It is hereby certified that error appears in the printed specification of the above numbered patent requiring correction and that the said Letters Patent should read as corrected below.

Column 13, line 22, claim 1, for "0.5 to 0.1 part" read -- 0.5 to 0.01 part --.

Signed and sealed this 3rd day of March 1959.

(SEAL)
Attest:

KARL H. AXLINE                                                  ROBERT C. WATSON
Attesting Officer                                            Commissioner of Patents